(12) United States Patent
Palmas et al.

(10) Patent No.: US 8,815,166 B2
(45) Date of Patent: Aug. 26, 2014

(54) PROCESS AND APPARATUS FOR MIXING TWO STREAMS OF CATALYST

(75) Inventors: Paolo Palmas, Des Plaines, IL (US); Mohammad-Reza Mostofi-Ashtiani, Naperville, IL (US); Lev Davydov, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/424,743

(22) Filed: Mar. 20, 2012

(65) Prior Publication Data

US 2013/0250716 A1  Sep. 26, 2013

(51) Int. Cl.
   *F27B 15/08* (2006.01)
(52) U.S. Cl.
   USPC .......................................................... 422/144
(58) Field of Classification Search
   USPC ................. 208/113; 366/167.1, 173.1, 173.2, 366/174.1, 175.2
   See application file for complete search history.

(56) References Cited

U.S. PATENT DOCUMENTS

| | | | | |
|---|---|---|---|---|
| 2,902,432 | A | * | 9/1959 | Codet .............................. 208/113 |
| 3,677,715 | A | * | 7/1972 | Morrison ........................ 208/155 |
| 3,801,009 | A | | 4/1974 | Marshall |
| 3,881,656 | A | | 5/1975 | Markfelt et al. |
| 3,888,762 | A | | 6/1975 | Gerhold |
| 3,896,026 | A | | 7/1975 | MacLean et al. |
| 4,026,821 | A | | 5/1977 | Schoofs et al. |
| 4,283,273 | A | * | 8/1981 | Owen ............................. 208/113 |
| 4,309,308 | A | | 1/1982 | Vickers |
| 4,417,974 | A | | 11/1983 | Haunschild |
| 4,564,502 | A | | 1/1986 | Skraba |
| 4,572,780 | A | | 2/1986 | Owen et al. |
| 4,605,491 | A | | 8/1986 | Haddad et al. |
| 4,793,915 | A | | 12/1988 | Haddad et al. |
| 5,017,343 | A | | 5/1991 | Cetinkaya |
| 5,062,945 | A | | 11/1991 | Pappal et al. |
| 5,098,553 | A | | 3/1992 | Sapre |
| 5,143,874 | A | | 9/1992 | Ross |
| 5,176,815 | A | | 1/1993 | Lomas |
| 5,194,227 | A | | 3/1993 | Miller et al. |
| 5,205,993 | A | | 4/1993 | Leib et al. |
| 5,288,397 | A | | 2/1994 | Markham et al. |
| 5,310,477 | A | | 5/1994 | Lomas |
| 5,318,691 | A | | 6/1994 | Muldowney |
| 5,346,613 | A | | 9/1994 | Lomas et al. |
| 5,451,313 | A | | 9/1995 | Wegerer et al. |
| 5,462,652 | A | | 10/1995 | Wegerer |

(Continued)

FOREIGN PATENT DOCUMENTS

| | | |
|---|---|---|
| GB | 862961 | 3/1961 |
| GB | 1387127 | 3/1975 |

(Continued)

OTHER PUBLICATIONS

U.S. Appl. No. 13/323,053, filed Dec. 12, 2011, Davydov.

(Continued)

*Primary Examiner* — Tony G SooHoo
*Assistant Examiner* — Anshu Bhatia
(74) *Attorney, Agent, or Firm* — James C Paschall

(57) ABSTRACT

A process and apparatus for mixing streams of regenerated and carbonized catalyst involves passing a catalyst stream around an insert in a lower section of a riser. The insert fosters mixing of the catalyst streams to reduce their temperature differential before contacting hydrocarbon feed.

20 Claims, 5 Drawing Sheets

(56) References Cited

U.S. PATENT DOCUMENTS

| | | |
|---|---|---|
| 5,489,154 A | 2/1996 | Algreen-Ussing |
| 5,514,271 A | 5/1996 | Buchanan et al. |
| 5,597,537 A | 1/1997 | Wegerer et al. |
| 5,840,254 A | 11/1998 | Carver, Jr. et al. |
| 5,858,207 A | 1/1999 | Lomas |
| 5,869,771 A | 2/1999 | Rajan et al. |
| 5,910,240 A * | 6/1999 | Senior et al. .............. 208/113 |
| 5,944,982 A | 8/1999 | Lomas |
| 5,965,012 A | 10/1999 | Lomas |
| 6,010,618 A | 1/2000 | Lomas |
| 6,183,699 B1 | 2/2001 | Lomas |
| 6,238,548 B1 | 5/2001 | Upson et al. |
| 6,491,875 B1 | 12/2002 | Palmas |
| 6,538,169 B1 | 3/2003 | Pittman et al. |
| 6,616,899 B1 | 9/2003 | Upson |
| 6,616,900 B1 | 9/2003 | Lomas |
| 6,835,302 B2 | 12/2004 | Cammy et al. |
| 6,866,771 B2 | 3/2005 | Lomas et al. |
| 6,869,521 B2 | 3/2005 | Lomas |
| 6,902,593 B2 | 6/2005 | Miller et al. |
| 7,011,740 B2 | 3/2006 | Tallman et al. |
| 7,293,909 B2 | 11/2007 | Taniguchi |
| 7,435,331 B2 | 10/2008 | Peterson et al. |
| 7,674,439 B2 | 3/2010 | Jacobs et al. |
| 7,799,287 B2 | 9/2010 | Hedrick et al. |
| 7,935,314 B2 | 5/2011 | Couch et al. |
| 8,025,717 B2 | 9/2011 | Dries et al. |
| 2003/0040105 A1 | 2/2003 | Sklar et al. |
| 2003/0116471 A1 | 6/2003 | Zhang et al. |
| 2008/0152552 A1 | 6/2008 | Hedrick et al. |
| 2010/0078357 A1 | 4/2010 | Couch et al. |
| 2010/0080741 A1 | 4/2010 | Couch et al. |
| 2011/0016856 A1 | 1/2011 | Wirth |
| 2011/0058989 A1 | 3/2011 | Couch et al. |
| 2012/0141333 A1 * | 6/2012 | Ulas Acikgoz et al. .... 196/14.52 |

FOREIGN PATENT DOCUMENTS

| | | |
|---|---|---|
| SU | 854267 A3 | 8/1981 |
| WO | 9301257 A1 | 1/1993 |
| WO | 2008119499 A1 | 10/2008 |

OTHER PUBLICATIONS

U.S. Appl. No. 13/323,129, filed Dec. 12, 2011, Davydov.
U.S. Appl. No. 13/323,217, filed Dec. 12, 2011, Wolschlag.
U.S. Appl. No. 13/323,249, filed Dec. 12, 2011, Wolschlag.
U.S. Appl. No. 13/424,713, filed Mar. 20, 2012, Palmas.
U.S. Appl. No. 13/424,796, filed Mar. 20, 2012, Johnson.
U.S. Appl. No. 13/424,820, filed Mar. 20, 2012, Johnson.
Search Report dated Aug. 1, 2013 for corresponding PCT Appl. No. PCT/US2013/027847.

* cited by examiner ially large which adds to the capital cost and requires more catalyst inventory to fill the increased volume added by the chamber to an entire process unit. However, we have discovered that carbonized and regenerated catalyst can be thoroughly mixed in a reactor riser by use of an insert.
PROCESS AND APPARATUS FOR MIXING TWO STREAMS OF CATALYST

BACKGROUND OF THE INVENTION

The invention relates to a process and apparatus for mixing carbonized and regenerated catalyst. A field of the invention may be the field of fluid catalytic cracking (FCC).

FCC is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke are deposited on the catalyst to provide coked or carbonized catalyst. This carbonized catalyst is often referred to as spent catalyst. However, this term may be misconstrued because the carbonized catalyst still has significant catalytic activity. Vaporous products are separated from carbonized catalyst in a reactor vessel. Carbonized catalyst may be subjected to stripping over an inert gas such as steam to strip entrained hydrocarbonaceous gases from the carbonized catalyst. A high temperature regeneration with oxygen within a regeneration zone operation burns coke from the carbonized catalyst which may have been stripped.

Although the carbonized catalyst carries coke deposits it may still have activity. U.S. Pat. No. 3,888,762 discloses mixing carbonized and regenerated catalyst for contact with the hydrocarbon feed. The regenerated catalyst may be in the range of 593° to 760° C. (1100° to 1400° F.) and the carbonized catalyst may be in the range of 482° to 621° C. (900° to 1150° F.). U.S. Pat. No. 5,597,537 discloses mixing the carbonized and regenerated catalyst in a blending vessel to allow the regenerated and carbonized catalyst to reach a temperature equilibrium before contacting the hydrocarbon feed. U.S. Pat. No. 7,935,314 B2 discloses baffles in the riser to obstruct upward catalyst flow to foster mixing. A mixed catalyst with more uniform temperature avoids hot spots that can generate nonselective cracking to reduce the value of the product hydrocarbons.

Improved apparatus and processes are sought in the mixing of carbonized and regenerated catalyst.

SUMMARY OF THE INVENTION

We have found that the mixing chamber for process units that are designed to process large amounts of feed can become very large which adds to the capital cost and requires more catalyst inventory to fill the increased volume added by the chamber to an entire process unit. However, we have discovered that carbonized and regenerated catalyst can be thoroughly mixed in a reactor riser by use of an insert.

In an apparatus embodiment, the present invention is an apparatus for mixing two streams of catalyst comprising a riser. A first catalyst conduit and a second catalyst conduit are in communication with the riser. An insert in the riser between the first catalyst conduit and the second catalyst conduit obstructs direct passage between the first catalyst conduit and the second catalyst conduit.

In an additional apparatus embodiment, the present invention is an apparatus for mixing two streams of catalyst comprising a riser. A first catalyst conduit is in communication with the riser at a first catalyst inlet and a second catalyst conduit is in communication with the riser at a second catalyst inlet. Lastly, an insert is provided in the riser between the first catalyst inlet and the second catalyst inlet.

In a further apparatus embodiment, the present invention is an apparatus for mixing two streams of catalyst comprising a riser having an enlarged lower section and a narrowed upper section and a transition section in between the enlarged lower section and the narrowed upper section. A feed distributor is disposed in the narrowed upper section of the riser. A first catalyst conduit and a second catalyst conduit are in communication with the enlarged lower section of the riser. An insert is provided in the enlarged lower section of the riser between the first catalyst conduit and the second catalyst conduit below the transition section.

In a process embodiment, the present invention is a process for mixing two streams of catalyst comprising feeding a first stream of catalyst to a riser. A second stream of catalyst is also fed to the riser. The first stream of catalyst is passed around an insert in the riser to mix with the second stream of catalyst, and the second stream of catalyst is passed around the insert to mix with the first stream of catalyst. The first stream of catalyst and the second stream of catalyst are passed around the insert and up the riser.

In an additional process embodiment, the present invention is a process comprising feeding a first stream of catalyst to an enlarged lower section of a riser. A second stream of catalyst is also fed to the enlarged lower section of the riser. The first stream of catalyst is passed around an insert in the riser to mix with the second stream of catalyst, and the second stream of catalyst is passed around the insert to mix with the first stream of catalyst. The first stream of catalyst and the second stream of catalyst are passed around the insert and up the riser. The first stream of catalyst and the second stream of catalyst are further passed above the insert and into a narrowed section of the riser.

In a further process embodiment, the present invention is a process for mixing two streams of catalyst comprising feeding a first stream of catalyst to a riser and feeding a second stream of catalyst to the riser. The first stream of catalyst is passed around an insert in the riser to mix with the second stream of catalyst, and the second stream of catalyst is passed around the insert to mix with the first stream of catalyst. Swirling of at least one of the first catalyst stream and the second catalyst stream around the insert is facilitated by use of vanes on the insert. Lastly, the first stream of catalyst and the second stream of catalyst are passed around the insert and up the riser.

The insert utilized in the riser facilitates mixing between the first regenerated catalyst stream and the second carbonized catalyst stream. The arrangement also reduces the catalyst volume and pressure drop required to mix the two catalyst streams.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through an intermediate vessel.

The term "feeding" means that the feed passes from a conduit or vessel directly to an object without passing through an intermediate vessel.

The term "passing" includes "feeding" and means that the material passes from a conduit or vessel to an object.

The term "directing" means that the feed passes from a conduit or vessel which imparts a trajectory or a direction to the feed.

The term "upwardly relative to vertical" means that an angle is the smallest angle defined by an object and an imaginary vertical line.

DETAILED DESCRIPTION OF THE INVENTION

Figure 1:
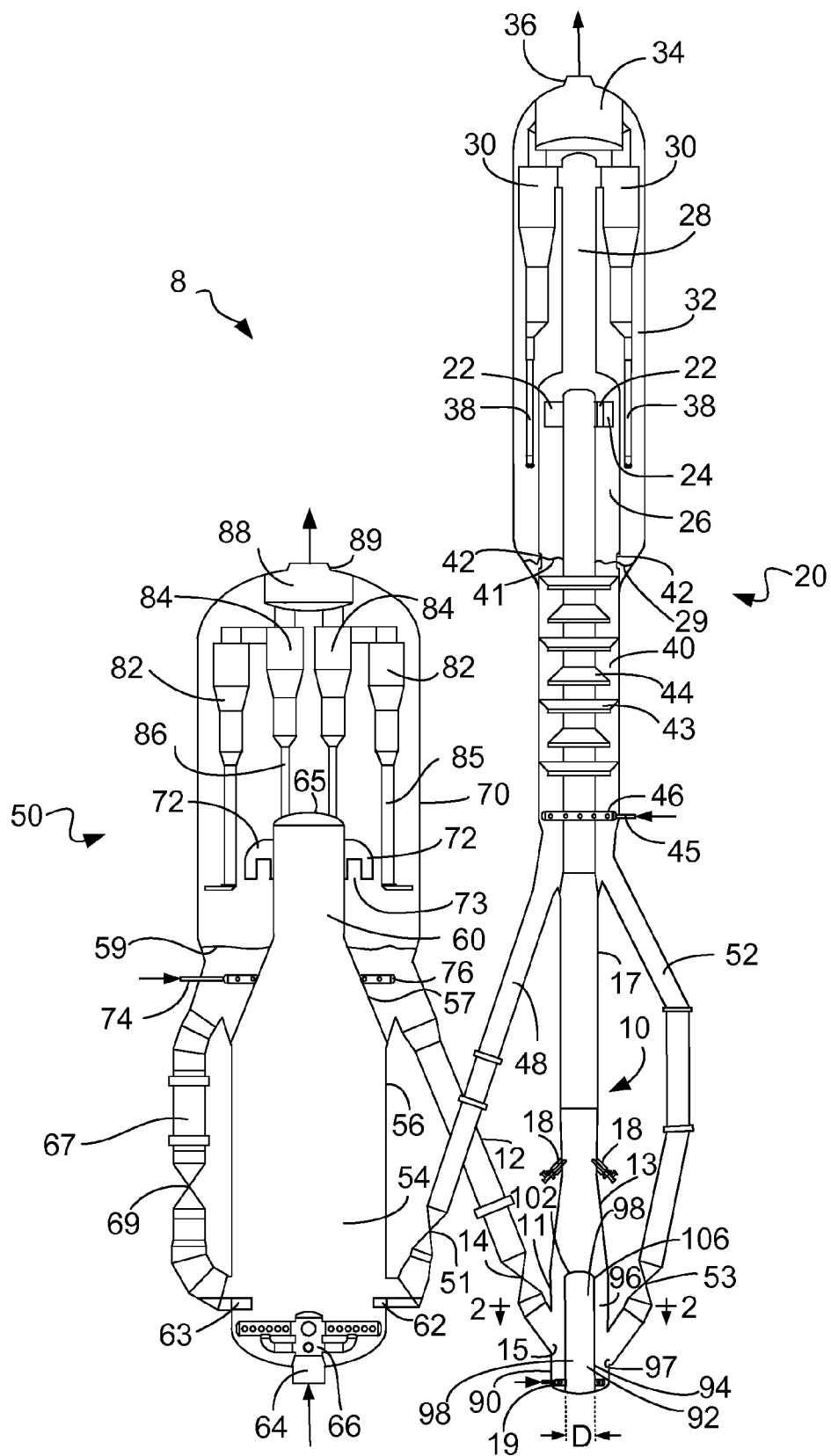
FIG. 1 is a schematic, elevational view of an FCC unit incorporating the present invention.

The apparatus and process of the present invention is for mixing regenerated catalyst and carbonized catalyst for contact with a hydrocarbon feed. The present invention may be useful in any solids-gas contacting equipment. However, ready usefulness is found in an FCC unit. FIG. 1 shows an FCC unit 8 that includes a reactor vessel 20 and a regenerator vessel 50. A first regenerated catalyst conduit 12 transfers a first regenerated catalyst stream from the regenerator vessel 50 at a rate regulated by a control valve 14 through a regenerated catalyst inlet 15 of the first regenerated catalyst conduit 12 to the reactor riser 10. A second carbonized catalyst conduit 52 transfers a second carbonized catalyst stream from the reactor vessel 20 at a rate regulated by a control valve 53 through a carbonized catalyst inlet 97 of the second carbonized catalyst conduit 52 to the reactor riser 10.

The riser 10 is an elongated vertical tube typically made of killed carbon steel. The riser 10 may comprise an enlarged lower section 11 and a narrower upper section 17. The narrow upper section 17 may be made of chrome steel. The enlarged lower section 11 may have a larger diameter than the narrower upper section 17 of the riser. The enlarged lower section 11 may include a hemispherical bottom. The enlarged lower section 11 may include a frustoconical transition section 13 that tapers between the enlarged diameter of the enlarged lower section and the narrowed diameter of the upper section 17 of the riser. The first regenerated catalyst conduit 12 and a second carbonized catalyst conduit 52 may connect to the lower section 11 at a wall 90 of the lower section at inlets 15 and 97, respectively. The inner surface of the entire riser 10 may be coated with a refractory material.

A fluidization medium such as steam from a ring 19 in the enlarged lower section 11 urges catalyst upwardly through the riser 10 at a relatively high density. A plurality of feed distributors 18 located in the upper section 17 of the riser 10 just above the transition section 13 inject feed across the flowing stream of catalyst particles to distribute hydrocarbon feed to the riser 10. Upon contacting the hydrocarbon feed with catalyst in the reactor riser 10 the heavier hydrocarbon feed cracks to produce lighter gaseous hydrocarbon product while coke is deposited on the catalyst particles to produce carbonized catalyst.

A conventional FCC feedstock and higher boiling hydrocarbon feedstock are suitable feeds. The most common of such conventional feedstocks is a "vacuum gas oil" (VGO), which is typically a hydrocarbon material having a boiling range of from 343° to 552° C. (650 to 1025° F.) prepared by vacuum fractionation of atmospheric residue. Such a fraction is generally low in coke precursors and heavy metal contamination which can serve to contaminate catalyst. Heavy hydrocarbon feedstocks to which this invention may be applied include heavy bottoms from crude oil, heavy bitumen crude oil, shale oil, tar sand extract, deasphalted residue, products from coal liquefaction, atmospheric and vacuum reduced crudes. Heavy feedstocks for this invention also include mixtures of the above hydrocarbons and the foregoing list is not comprehensive. It is also contemplated that lighter recycle or previously cracked feeds such as naphtha may be a suitable feedstock.

The reactor vessel 20 is in downstream communication with the riser 10. In the reactor vessel, the carbonized catalyst and the gaseous product are separated. The resulting mixture of gaseous product hydrocarbons and carbonized catalyst continues upwardly through the riser 10 into the reactor vessel 20 in which the carbonized catalyst and gaseous product are separated. A pair of disengaging arms 22 may tangentially and horizontally discharge the mixture of gas and catalyst from a top of the riser 10 through one or more outlet ports 24 (only one is shown) into a disengaging vessel 26 to effect partial separation of gases from the catalyst. Two, three or four disengaging arms 22 may be used depending on the size of the FCC unit.

A transport conduit 28 carries the hydrocarbon vapors, including stripped hydrocarbons, stripping media and entrained catalyst to one or more cyclones 30 in the reactor vessel 20 which separates carbonized catalyst from the product hydrocarbon gaseous stream. The disengaging vessel 26 is partially disposed in the reactor vessel 20 and can be considered part of the reactor vessel 20. A collection plenum 34 in the reactor vessel 20 gathers the separated hydrocarbon gaseous streams from the cyclones 30 for passage to an outlet nozzle 36 and eventually into a fractionation recovery zone (not shown). Diplegs 38 discharge catalyst from the cyclones 30 into a lower bed 29 in the reactor vessel 20. The catalyst with adsorbed or entrained hydrocarbons may eventually pass from the lower bed 29 into an optional stripping section 40 across ports 42 defined in a wall of the disengaging vessel 26. Catalyst separated in the disengaging vessel 26 may pass directly into the optional stripping section 40 via a bed 41. A fluidizing conduit 45 delivers inert fluidizing gas, typically steam, to the stripping section 40 through a fluidizing distributor 46. The stripping section 40 contains baffles 43, 44 or other equipment to promote contacting between a stripping gas and the catalyst. The stripped, carbonized catalyst leaves the stripping section 40 of the disengaging vessel 26 of the reactor vessel 20 with a lower concentration of entrained or adsorbed hydrocarbons than it had when it entered or if it had not been subjected to stripping. A first portion of the carbonized catalyst leaves the disengaging vessel 26 of the reactor vessel 20 through a spent catalyst conduit 48 and feeds into the regenerator vessel 50 at a rate regulated by a control valve 51. A second portion of the carbonized catalyst that has been coked in the reactor riser 10 leaves the disengaging vessel 26 of the reactor vessel 20 and is fed through the second carbonized catalyst conduit 52 back to the riser 10 at a rate regulated by a control valve 53. The second carbonized catalyst conduit 52 is in downstream communication with the reactor vessel 20. The second carbonized catalyst conduit 52 is in downstream communication with the outlet port 24 of the riser 10 and in upstream communication with a carbonized catalyst inlet 97 of the second carbonized catalyst conduit 52 to the riser 10.

The riser 10 of the FCC process is maintained at high temperature conditions which generally include a temperature above about 425° C. (797° F.). In an embodiment, the reaction zone is maintained at cracking conditions which include a temperature of from about 480° to about 621° C. (896° to 1150° F.) at the riser outlet port 24 and a pressure from about 69 to about 517 kPa (ga) (10 to 75 psig) but typically less than about 275 kPa (ga) (40 psig). The catalyst-to-oil ratio, based on the weight of catalyst and feed hydrocarbons entering the bottom of the riser, may range up to 30:1 but is typically between about 4:1 and about 10:1 and may range between 7:1 and 25:1. Hydrogen is not normally added to the riser, although hydrogen addition is known in the art. Steam may be passed into the riser 10 and reactor vessel 20 equivalent to about 2-35 wt-% of feed. Typically, however, the steam rate will be between about 2 and about 7 wt-% for maximum gasoline production and about 10 to about 20 wt-% for maximum light olefin production. The average residence time of catalyst in the riser may be less than about 5 seconds. The type of catalyst employed in the process may be chosen from a variety of commercially available catalysts. A catalyst comprising a zeolitic material such as Y zeolite is preferred, but the older style amorphous catalysts can be used if desired. Additionally, shape-selective additives such as ZSM-5 may be included in the catalyst composition to increase light olefin production.

The regenerator vessel 50 is in downstream communication with the reactor vessel 20. In the regenerator vessel 50, coke is combusted from the portion of carbonized catalyst delivered to the regenerator vessel 50 by contact with an oxygen-containing gas such as air to provide regenerated catalyst. The regenerator vessel 50 may be a combustor type of regenerator, which may use hybrid turbulent bed-fast fluidized conditions in a high-efficiency regenerator vessel 50 for completely regenerating carbonized catalyst. However, other regenerator vessels and other flow conditions may be suitable for the present invention. The spent catalyst conduit 48 feeds carbonized catalyst to a first or lower chamber 54 defined by outer wall 56 through a spent catalyst inlet chute 62. The carbonized catalyst from the reactor vessel 20 usually contains carbon in an amount of from 0.2 to 2 wt-%, which is present in the form of coke. Although coke is primarily composed of carbon, it may contain from 3 to 12 wt-% hydrogen as well as sulfur and other materials. An oxygen-containing combustion gas, typically air, enters the lower chamber 54 of the regenerator vessel 50 through a conduit 64 and is distributed by a distributor 66. As the combustion gas enters the lower chamber 54, it contacts carbonized catalyst entering from chute 62 and lifts the catalyst at a superficial velocity of combustion gas in the lower chamber 54 of perhaps at least 1.1 m/s (3.5 ft/s). In an embodiment, the lower chamber 54 may have a catalyst density of from 48 to 320 kg/m$^3$ (3 to 20 lb/ft$^3$) and a superficial gas velocity of 1.1 to 6.1 m/s (3.5 to 20 ft/s). The oxygen in the combustion gas contacts the carbonized catalyst and combusts carbonaceous deposits from the catalyst to at least partially regenerate the catalyst and generate flue gas.

In an embodiment, to accelerate combustion of the coke in the lower chamber 54, hot regenerated catalyst from a dense catalyst bed 59 in an upper or second chamber 70 may be recirculated into the lower chamber 54 via an external recycle catalyst conduit 67 regulated by a control valve 69. Hot regenerated catalyst enters the lower chamber 54 through an inlet chute 63. Recirculation of regenerated catalyst, by mixing hot catalyst from the dense catalyst bed 59 with relatively cooler carbonized catalyst from the spent catalyst conduit 48 entering the lower chamber 54, raises the overall temperature of the catalyst and gas mixture in the lower chamber 54.

The mixture of catalyst and combustion gas in the lower chamber 54 ascend through a frustoconical transition section 57 to the transport, riser section 60 of the lower chamber 54. The riser section 60 defines a tube which is preferably cylindrical and extends preferably upwardly from the lower chamber 54. The mixture of catalyst and gas travels at a higher superficial gas velocity than in the lower chamber 54. The increased gas velocity is due to the reduced cross-sectional area of the riser section 60 relative to the cross-sectional area of the lower chamber 54 below the transition section 57. Hence, the superficial gas velocity may usually exceed about 2.2 m/s (7 ft/s). The riser section 60 may have a lower catalyst density of less than about 80 kg/m$^3$ (5 lb/ft$^3$).

The regenerator vessel 50 also includes an upper or second chamber 70. The mixture of catalyst particles and flue gas is discharged from an upper portion of the riser section 60 into the upper chamber 70. Substantially completely regenerated catalyst may exit the top of the transport, riser section 60, but arrangements in which partially regenerated catalyst exits from the lower chamber 54 are also contemplated. Discharge is effected through a disengaging device 72 that separates a majority of the regenerated catalyst from the flue gas. In an embodiment, catalyst and gas flowing up the riser section 60 impact a top elliptical cap 65 of the riser section 60 and reverse flow. The catalyst and gas then exit through downwardly directed discharge outlets 73 of disengaging device 72. The sudden loss of momentum and downward flow reversal cause a majority of the heavier catalyst to fall to the dense catalyst bed 59 and the lighter flue gas and a minor portion of the catalyst still entrained therein to ascend upwardly in the upper chamber 70. Cyclones 82, 84 further separate catalyst from ascending gas and deposits catalyst through dip legs 85, 86 into dense catalyst bed 59. Flue gas exits the cyclones 82, 84 and collects in a plenum 88 for passage to an outlet nozzle 89 of regenerator vessel 50 and perhaps into a flue gas or power recovery system (not shown). Catalyst densities in the dense catalyst bed 59 are typically kept within a range of from about 640 to about 960 kg/m$^3$ (40 to 60 lb/ft$^3$). A fluidizing conduit 74 delivers fluidizing gas, typically air, to the dense catalyst bed 59 through a fluidizing distributor 76. In a combustor-style regenerator, approximately no more than 2% of the total gas requirements within the process enter the dense catalyst bed 59 through the fluidizing distributor 76. In this embodiment, gas is added here not for combustion purposes but only for fluidizing purposes, so the catalyst will fluidly exit through the catalyst conduits 67 and 12. The fluidizing gas added through the fluidizing distributor 76 may be combustion gas. In the case where partial combustion is effected in the lower chamber 54, greater amounts of combustion gas will be fed to the upper chamber 70 through fluidizing conduit 74.

From about 10 to 30 wt-% of the catalyst discharged from the lower chamber 54 is present in the gases above the outlets 73 from the riser section 60 and enter the cyclones 82, 84. The regenerator vessel 50 may typically require 14 kg of air per kg of coke removed to obtain complete regeneration. When more catalyst is regenerated, greater amounts of feed may be processed in a conventional reactor riser. The regenerator vessel 50 typically has a temperature of about 594 to about 732° C. (1100 to 1350° F.) in the lower chamber 54 and about 649 to about 760° C. (1200 to 1400° F.) in the upper chamber 70. The regenerated catalyst conduit 12 is in downstream communication with the regenerator vessel 50 and communicates with the riser 10. Regenerated catalyst from dense catalyst bed 59 is transported through regenerated catalyst conduit 12 as a first stream of catalyst from the regenerator vessel 50 back to the reactor riser 10 through the control valve 14 where it again contacts feed as the FCC process continues. The carbonized catalyst in conduit 52 comprises a second stream of catalyst.

The first stream of regenerated catalyst and a second stream of carbonized catalyst fed into the riser 10 tend not to mix thoroughly before contacting the hydrocarbon feed. Accordingly, the feed can encounter catalyst at varying temperatures resulting in non-selective cracking to a composition with relatively more undesirable products. In an aspect, to ensure mixing between the carbonized catalyst and the regenerated catalyst, means is necessary in the lower end 11 of the riser 10 to facilitate catalyst mixing.

In an embodiment shown in FIG. 1, the first regenerated catalyst conduit 12 and the second carbonized catalyst conduit 52 connect to and are in communication with the riser 10. The first stream of regenerated catalyst in the first regenerated catalyst conduit 12 and the second stream of carbonized catalyst in the second carbonized catalyst conduit 52 are fed to the riser 10 and mixed together. One or both of the first regenerated catalyst conduit 12 and the second carbonized catalyst conduit 52 may tangentially connect to the enlarged lower section 11 of the riser 10 tangentially to impart an angular motion to catalyst discharged into the riser to promote mixing therein. Additionally, ramps may be installed at the connection between one or both of the first regenerated catalyst conduit 12 and the second carbonized catalyst conduit 52 and the enlarged lower section 11 of the riser 10 also to promote mixing in the enlarged lower section 11. After mixing, a mixture of the first stream of regenerated catalyst and the second stream of carbonized catalyst pass upwardly in the riser 10.

The riser may include an insert 92. In an aspect, the enlarged lower section 11 of the riser 10 may include the insert 92. In an aspect, the insert 92 is contained in the enlarged lower section 11 of the riser. The insert 92 may have an outer wall 94 that is spaced apart from an inner surface of the wall 90 of the enlarged lower section 11 of the riser 10. In an aspect, the insert 92 is radially centered in the enlarged lower section 11 of the riser 10. In other words, although not shown, the insert 92 has a central longitudinal axis aligned with a central longitudinal axis of the riser. In a further aspect, the outer wall 94 of the insert is a vertical wall. The diameter D of the insert 92 may be between 0.6 and 1.5 and preferably between 0.8 and 1.2 times the diameter of the largest one of the first regenerated catalyst conduit 12 and the second carbonized catalyst conduit 52.

The wall 94 of the insert 92 and the wall 90 of the riser define a space 96 therebetween. In an aspect, insert 92 and the enlarged lower section 11 may each be tubular so that together they define an annular space 96 or annulus between the wall 94 of the insert 92 and the wall 90 of the enlarged lower section 11. The first regenerated catalyst conduit 12 and the second carbonized catalyst conduit 52 may communicate with the space 96, so the first regenerated catalyst conduit 12 feeds the first stream of regenerated catalyst to the space 96 and the second carbonized catalyst conduit 52 feeds the second stream of carbonized catalyst to the space 96. The catalyst in the space 96 is fluidized by fluidizing gas from fluidizing distributor 19.

Figure 2:
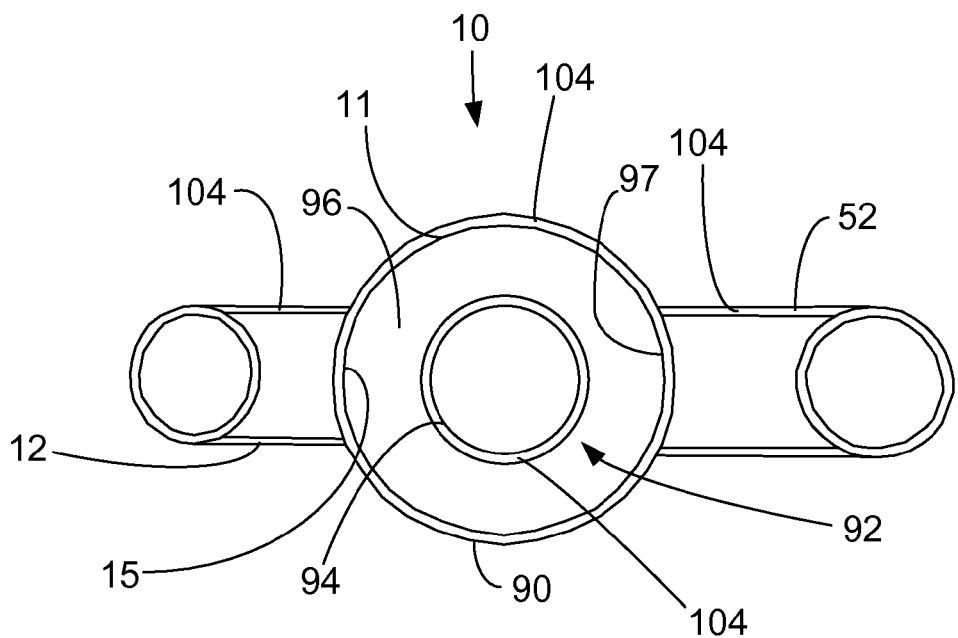
FIG. 2 is a sectional view of FIG. 1 taken at segment 2-2.

FIG. 2 shows a plan sectional view of segment 2-2 taken in FIG. 1. Refractory lining 104 on the wall 94 of the insert 92 and the walls of the lower section 11 of the riser 10, the first regenerated catalyst conduit 12 and the second carbonized catalyst conduit 52 are shown in FIG. 2, but not in FIG. 1. The insert 92 may be positioned between the first catalyst conduit 12 and the second catalyst conduit 52 to obstruct direct passage of catalyst between the first catalyst conduit and the second catalyst conduit. The insert 92 may be located in the enlarged lower section 11 of the riser 10. The first catalyst conduit 12 is connected to the riser 10 at a first catalyst inlet 15 and the second catalyst conduit 52 is connected to the riser 10 at a second catalyst inlet 97, and the insert 92 is interposed between the first catalyst inlet and the second catalyst inlet. In an aspect, the first catalyst conduit 12 may be connected to the riser 10 at a first catalyst inlet 15 located in the enlarged section 11 of the riser 10, the second catalyst conduit 52 may be connected to the riser 10 at a second catalyst inlet 97 located in the enlarged section 11 of the riser 10, and the insert 92 may be interposed between the first catalyst inlet and the second catalyst inlet located in the enlarged section 11 of the riser 10. The first stream of catalyst and the second stream of catalyst may be fed to the space 96 between the wall 90 of the riser and the wall 94 of the insert 92.

The first stream of regenerated catalyst from the first regenerated catalyst conduit 12 may be fed to the riser 10 riser radially through the first regenerated catalyst inlet 15. As such, the first regenerated catalyst conduit may be radially disposed with respect to the wall 90 of the riser 10. Specifically, the first stream of regenerated catalyst from the first regenerated catalyst conduit 12 may be fed to the enlarged lower section 11 of the riser 10 riser radially through the first regenerated catalyst inlet 15. As such, the first regenerated catalyst conduit 12 may be radially disposed with respect to the wall 90 of the enlarged lower section 11 of the riser 10. The second stream of carbonized catalyst from the second carbonized catalyst conduit 52 may be fed to the riser 10 riser radially through the second carbonized catalyst inlet 97. As such, the second carbonized catalyst conduit 52 may be radially disposed with respect to the wall 90 of the riser 10. Specifically, the second stream of carbonized catalyst from the second carbonized catalyst conduit 52 may be fed to the enlarged lower section 11 of the riser 10 riser radially through the second carbonized catalyst inlet 97. As such, the second carbonized catalyst conduit may be radially disposed with respect to the wall 90 of the enlarged lower section 11 of the riser 10.

The first stream of regenerated catalyst is passed from the first regenerated catalyst inlet 15 around the insert 92 in the riser 10 to mix with the second stream of carbonized catalyst from the second carbonized catalyst inlet 97, and the second stream of carbonized catalyst is passed from the second carbonized catalyst inlet 97 around the insert 92 in the riser 10 to mix with the first stream of regenerated catalyst from the first regenerated catalyst inlet 15. The first stream of catalyst and the second stream of catalyst may pass in the annular space 96 in the riser 10 to mix with each other. The mixed stream of the first stream of regenerated catalyst and the second stream of carbonized catalyst pass around the insert 92 and up the riser 10.

Turning back to FIG. 1, the wall 94 of the insert 92 is impermeable to catalyst, so it prevents catalyst from passing into the insert. The insert 92 has a closed top 102 which may comprise a hemispherical head. The top 102 is also impermeable to catalyst, so it prevents catalyst from entering into the top of the insert 92. Accordingly, the entire insert 92 may be impermeable to catalyst, so no catalyst enters into the insert 92. The closed top 102 is disposed at an elevation about as high as the top of the enlarged lower section 11. The insert 92 serves to reduce the cross sectional area of the enlarged lower section 11 to about half of the cross sectional area of the enlarged lower section 11 below the closed top 102. Consequently, the superficial velocity in the enlarged lower section 11 at the elevation of the insert is about twice the superficial velocity in the enlarged lower section 11 at an elevation not of the insert 92.

The insert is in an enlarged section 11 of the riser 10. The narrowed upper section 17 of the riser 10 is above the insert 92. A frustoconical transition section 13 of the riser is between the enlarged section 11 and the narrowed section 17 to transition the larger diameter of the enlarged lower section 11 to the narrower narrowed upper section 17. Consequently, the transition section 13 transitions the mixed stream of the first stream of regenerated catalyst and the second stream of carbonized catalyst from an enlarged lower section to a narrowed upper section as the mixed stream of catalyst is passed up the riser. In an aspect, the insert 92 does not extend into the transition section 13, so the transitioning occurs after the mixed stream of catalyst is passed above the insert 92. Feed distributors 18 are typically disposed in the narrowed upper section 17 of the riser 10 above the enlarged lower section 11, the transition section 13 and the insert 92. Consequently, the feed is injected into the ascending catalyst stream that is thoroughly mixed together.

It is anticipated that the insert 92 be made of stainless steel such as 300 Series stainless steel and be lined with refractory. Additionally, the insert 92 may be made of or coated with a ceramic or other material that resists erosion.

Figure 3:
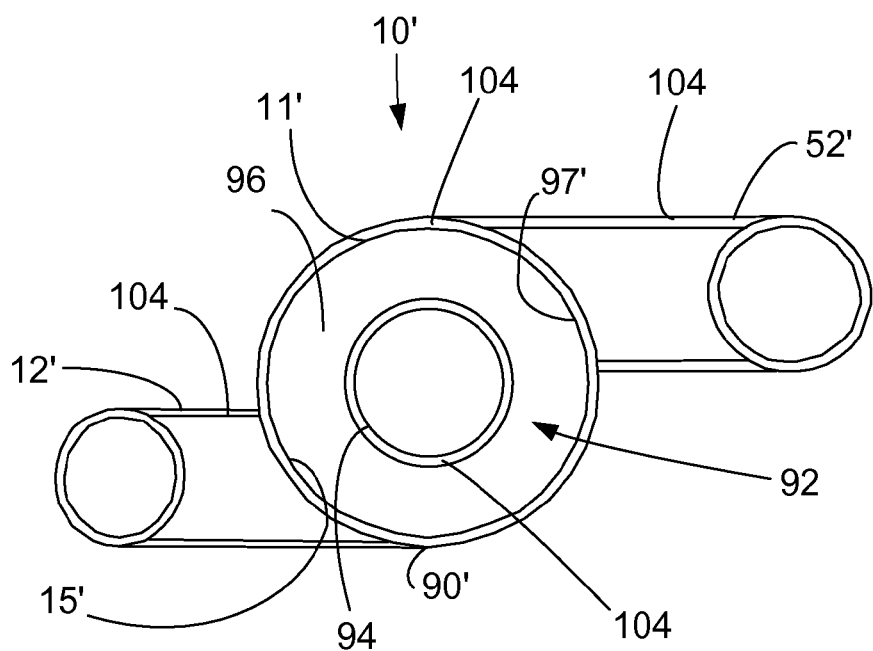
FIG. 3 is a sectional view of FIG. 1 taken at segment 2-2 of an alternative embodiment of FIG. 2.

FIG. 3 also shows a plan sectional view of segment 2-2 taken in FIG. 1 which is an alternative to FIG. 2. FIG. 3 illustrates a further embodiment of FIG. 1 with a modified relationship between the first regenerated catalyst conduit 12' and the second carbonized catalyst conduit 52' and the riser 10. Elements in FIG. 3 with the same configuration as in FIG. 2 will have the same reference numeral as in FIGS. 1 and 2. Elements in FIG. 3 which have a different configuration as the corresponding element in FIG. 2 will have the same reference numeral but be succeeded with a prime symbol ('). The apparatus and process in FIG. 3 is the same as in FIG. 2 with the exception of the noted following differences.

The first regenerated catalyst conduit 12' may be tangentially disposed with respect to the riser 10'. Moreover, the second carbonized catalyst conduit may be tangentially disposed with respect to the riser 10'. Tangential disposition means that the outer-most portion of the conduit is disposed tangentially with the wall 90' of the riser 10'. In an aspect, the first regenerated catalyst conduit 12' may be tangentially disposed with respect to the wall 90' of the enlarged lower section 11' of the riser 10', and the second carbonized catalyst conduit 52' may be tangentially disposed with respect to the wall 90' of the enlarged lower section 11' of the riser 10'. The first stream of regenerated catalyst from the first regenerated catalyst conduit 12' may be fed to the riser 10' riser tangentially through the first regenerated catalyst inlet 15'. Specifically, the first stream of regenerated catalyst from the first regenerated catalyst conduit 12 may be fed to the enlarged lower section 11' of the riser 10' riser tangentially through the first regenerated catalyst inlet 15'. The second stream of carbonized catalyst from the second carbonized catalyst conduit 52 may be fed to the riser 10' riser tangentially through the second carbonized catalyst inlet 97'. Specifically, the second stream of carbonized catalyst from the second carbonized catalyst conduit 52' may be fed to the enlarged lower section 11' of the riser 10' riser tangentially through the second carbonized catalyst inlet 97'. Although not shown, it is contemplated that one catalyst conduit may be tangentially disposed with respect to the riser 10', while the other catalyst conduit may be radially disposed with respect to the riser 10'.

It should be noted that FIGS. 2 and 3 show the first regenerated catalyst inlet 15, 15' and the second carbonized catalyst inlet 97, 97' disposed at a horizontal angle of 180 degrees with each other. However, the first regenerated catalyst inlet 15, 15' and the second carbonized catalyst inlet 97, 97' may be disposed at other angles with respect to each other such as 150 degrees.

Figure 4:
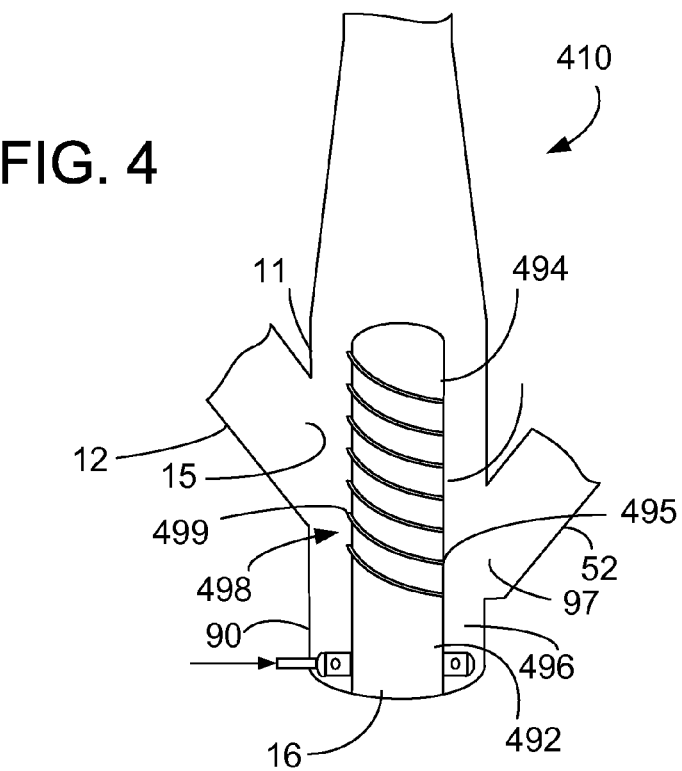
FIG. 4 is a partial schematic, elevational view of an alternative embodiment of the FCC unit of FIG. 1 incorporating an alternative embodiment of the present invention.

FIG. 4 illustrates a further embodiment of FIG. 1 with a modified mixing insert 492. Elements in FIG. 4 with the same configuration as in FIG. 1 will have the same reference numeral as in FIG. 1. Elements in FIG. 4 which have a different configuration as the corresponding element in FIG. 1 will have the same reference numeral but be preceded with the digit "4". Everything in FIG. 4 is the same as in FIG. 1 except the mixing insert 492.

In FIG. 4, the insert 492 is equipped with at least one vane 498 on the outer wall 494 of the insert that facilitates swirling of the catalyst. The insert 492 may be equipped with a plurality of vanes 498. In an aspect, the at least one vane 498 is sloped with a lower end 495 of the vane 498 facing the second catalyst inlet 97 and an upper end 499 of the vane facing the first catalyst inlet 15. In an aspect, it may be preferable to have the lower end of the vanes 498 face the lowermost catalyst inlet 15, 97. Preferably, the lowermost catalyst inlet will be second catalyst inlet 97, but the lowermost catalyst inlet may also be the first catalyst inlet 15. The at least one vane 98 facilitates swirling of the first stream of catalyst as it passes around the insert 492 and up the riser 410. The at least one vane 498 may also facilitate swirling of the second stream of catalyst as it passes around the insert 492 and up the riser 410. In an aspect, a plurality of vanes 498 are disposed in the insert to facilitate swirling of the catalyst. The at least one vane 498 may be curved or linear. When the lower end 495 of the vanes face the first catalyst inlet 15, the swirling of the first stream of regenerated catalyst will also induce the second stream of carbonized catalyst to swirl as well as they mix together around the insert 492. When the lower end 495 of the vanes face the second catalyst inlet 97, the swirling of the second stream of carbonized catalyst will also induce the first stream of regenerated catalyst to swirl as well as they mix together around the insert 492. The at least one vane may facilitate swirling of at least one of the first catalyst stream and the second catalyst stream as they ascend up the riser 10.

Figure 5:
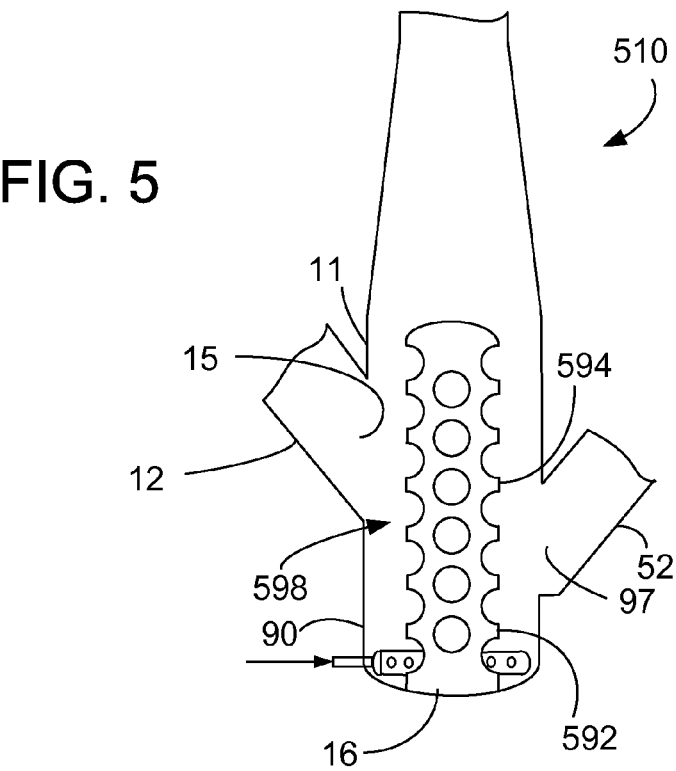
FIG. 5 is a partial schematic, elevational view of a further embodiment of the FCC unit of FIG. 1 incorporating a further embodiment of the present invention.

FIG. 5 illustrates a further embodiment of FIG. 1 with a modified mixing insert 592. Elements in FIG. 5 with the same configuration as in FIG. 1 will have the same reference numeral as in FIG. 1. Elements in FIG. 5 which have a different configuration as the corresponding element in FIG. 1 will have the same reference numeral but be preceded with the digit "5". Everything in FIG. 5 is the same as in FIG. 1 except the mixing insert 592.

In FIG. 5, the outer wall 594 of the insert 592 is equipped with at least one dimple 598 that provides sudden changes in the flow area which will enhance mixing. In an aspect, the outer wall is equipped with a plurality of dimples 598 covering the outer surface of the outer wall 594. The dimples 598 are not openings, but merely indentations in the outer wall 594. The plurality of dimples 598 may be arrayed in a triangular or other pitch in the outer surface of the outer wall 594. The dimples 598 may be hemispherical in shape but other shapes may be useful. Dimples may be 0.08 m (0.25 ft) to about 0.3 m (1.0 ft) in diameter and depth.

Figure 6:
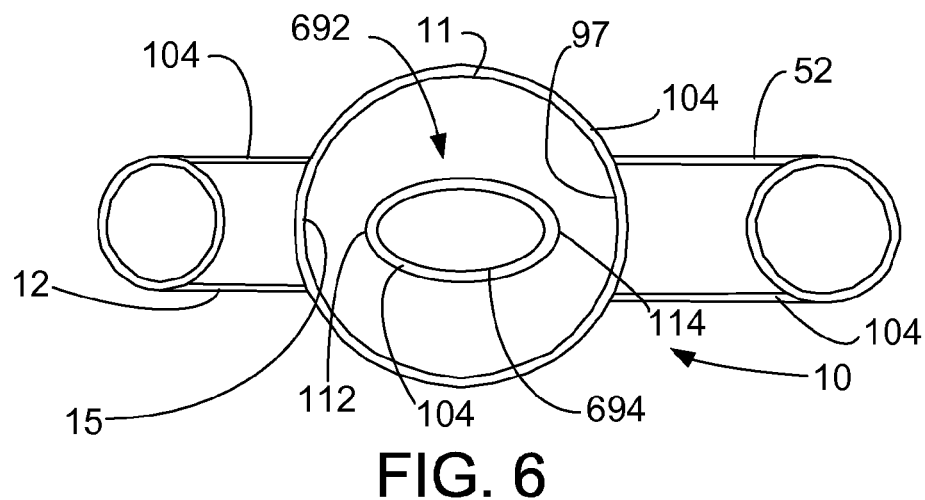
FIG. 6 is a sectional view of FIG. 1 taken at segment 2-2 of an alternative embodiment of FIG. 2.
Figure 7:
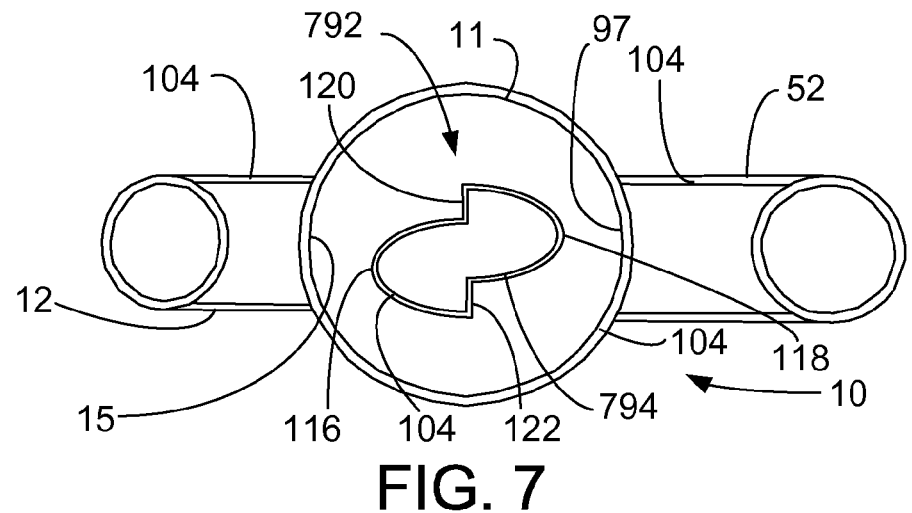
FIG. 7 is a sectional view of FIG. 1 taken at segment 2-2 of a further embodiment of FIG. 2.
Figure 8:
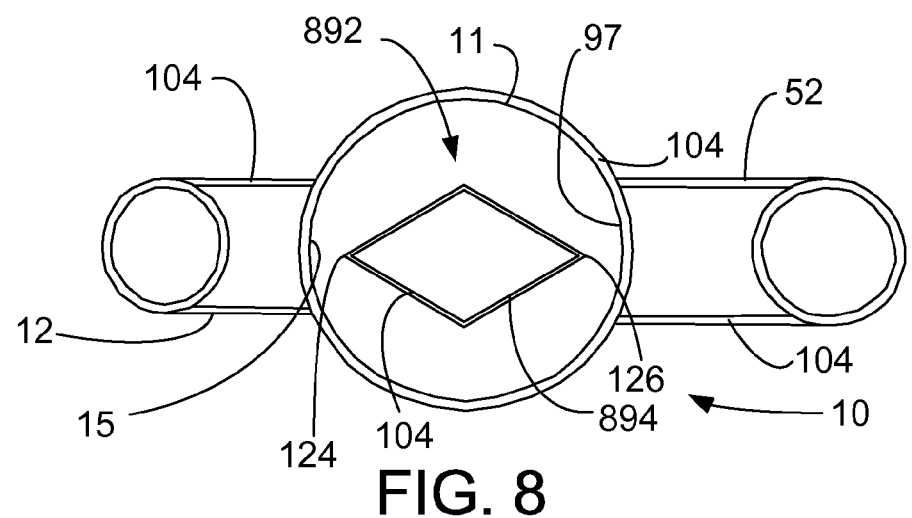
FIG. 8 is a sectional view of FIG. 1 taken at segment 2-2 of an additional embodiment of FIG. 2.

FIGS. 1-5 have shown the insert 92 with a cylindrical cross-sectional configuration. FIGS. 6-8 show alternative plan sectional views of segment 2-2 taken in FIG. 1 with different cross-sectional configurations of insert 92. Elements in FIGS. 6-8 with the same configuration as in FIG. 2 will have the same reference numeral as in FIG. 2. Elements in FIGS. 6-8 which have a different configuration as the corresponding element in FIG. 2 will have the same reference numeral but be preceded with the digit corresponding to the number of the Figure.

In FIGS. 6-8 refractory lining 104 is shown on the walls of the lower section 11 of the riser 10, the first regenerated catalyst conduit 12 and the second carbonized catalyst conduit 52, like in FIG. 2. In FIG. 6, the insert 692 may have a horizontal cross-sectional shape of an oval positioned between the first catalyst inlet 15 of the first regenerated catalyst conduit 12 and the second catalyst inlet 97 of the second carbonized catalyst conduit 52 to obstruct direct passage of catalyst between the first catalyst inlet 15 and the second catalyst inlet 97. In the case of FIG. 6, a first vertex 112 of the insert 692 faces the first catalyst inlet 15 and a second vertex 114 of the insert 692 faces the second catalyst inlet 97. The insert 692 may also include a refractory lining 104 on the outer wall 694.

In FIG. 7, the insert 792 may have a horizontal cross-sectional shape of two vertically offset contiguous parabolas with their apexes 116, 118 facing away from each other. The insert 792 may be positioned between the first catalyst inlet 15 of the first regenerated catalyst conduit 12 and the second catalyst inlet 97 of the second carbonized catalyst conduit 52 to obstruct direct passage of catalyst between the first catalyst inlet 15 and the second catalyst inlet 97. In the case of FIG. 7, a first apex 116 of the insert 792 faces the first catalyst inlet 15 and a second apex 118 of the insert 792 faces the second catalyst inlet 97. Non-overlapping sections of each parabola may be equipped with impermeable walls 120, 122 to prevent entry of catalyst into the insert 792. The insert 792 may also include a refractory lining 104 on the outer wall 794.

In FIG. 8, the insert 892 may have a horizontal cross-sectional shape of a rhomboid which may be positioned between the first catalyst inlet 15 of the first regenerated catalyst conduit 12 and the second catalyst inlet 97 of the second carbonized catalyst conduit 52 to obstruct direct passage of catalyst between the first catalyst inlet 15 and the second catalyst inlet 97. The insert 892 may be oriented, so as at least one vertex of the rhomboid cross-section points to a catalyst inlet. In the case of FIG. 8, a first vertex 124 of the insert 892 faces the first catalyst inlet 15 and a second vertex 126 of the insert 892 faces the second catalyst inlet 97. The insert 892 may also include a refractory lining 104 on the outer wall 894.

In FIGS. 6-8, the first regenerated catalyst inlet 15 and the second carbonized catalyst inlet 97 are disposed at a horizontal angle of 180 degrees with respect to each other. However, if the first regenerated catalyst inlet 15 and the second carbonized catalyst inlet 97 are disposed at other angles with respect to each other, such as 150 degrees, the cross-sectional shape of the insert 692, 792 and 892 may be less symmetrical to assure the apexes and vertices are directed toward the respective catalyst inlets.

Figure 9:
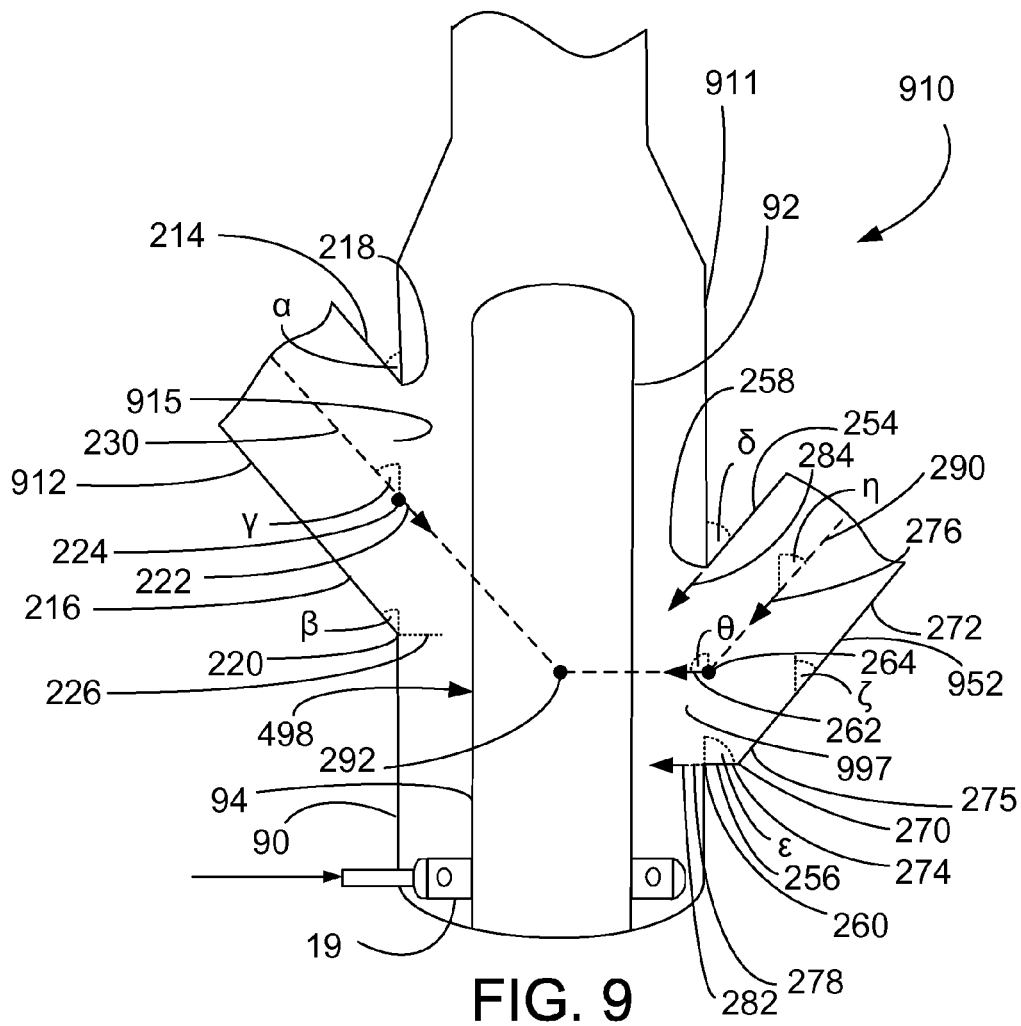
FIG. 9 is a partial schematic, elevational view of an alternative embodiment of the FCC unit of FIG. 1 incorporating an alternative embodiment of the present invention.

FIG. 9 illustrates a further embodiment of FIG. 1 with a first catalyst conduit 912 and a second catalyst conduit 952 modified. Elements in FIG. 9 with the same configuration as in FIG. 1 will have the same reference numeral as in FIG. 1. Elements in FIG. 9 which have a different configuration as the corresponding element in FIG. 1 will have the same reference numeral but be preceded with the digit "9". Everything in FIG. 9 is the same as in FIG. 1 with the noted exceptions.

The first catalyst conduit 912 is in upstream communication with the riser 910 and defines a first catalyst inlet 915 with the riser. In an aspect, the first catalyst inlet 915 is in the enlarged lower section 911 of the riser. The first catalyst conduit 912 has a first top 214 which intersects the riser at the first inlet 915 at a first top intersection 218 and a first bottom 216 which intersect the riser at the first inlet 915 at a first bottom intersection 220. The first top 214 intersects the riser 910, in an aspect, the enlarged lower section 911 of the riser, defining a first top angle $\alpha$, upwardly relative to vertical at the first top intersection 218, and the first bottom 216 intersects the riser 910, in an aspect, the enlarged lower section 911 of the riser, defining a first bottom angle $\beta$, upwardly relative to vertical at the first bottom intersection 220. In an aspect, the first catalyst conduit 912 may be in direct and downstream communication with the regenerator vessel 50 and may therefore be termed a first regenerated catalyst conduit for carrying a hot first regenerated catalyst stream. It is also contemplated that the first catalyst conduit 912 may be in downstream communication with the outlet port 24 (FIG. 1) of the riser 910 and in which case may be termed a carbonized catalyst conduit. In an aspect, the first top angle $\alpha$ and the first bottom angle $\beta$ may be equal to provide a parallel first top 214 and first bottom 216.

The first catalyst conduit 912 feeds a first stream of catalyst to the riser 910 in a first trajectory 222 imparted by the interior contour of the first top 214 and the first bottom 216 at the first inlet 915. The trajectory 222 defines a first angle $\gamma$ upwardly relative to vertical. The trajectory 222 is shown by an arrow from a midpoint 224 between the first top intersection 218 and the first bottom intersection 220. The first trajectory 222 has a substantial, downwardly vertical component.

In an aspect, the first trajectory angle $\gamma$ is equal to the first top angle $\alpha$ and the first bottom angle $\beta$. In a further aspect, the first trajectory angle $\gamma$ is less than about 60 degrees. The first stream of catalyst enters the riser through the first catalyst inlet 915 at a first lowermost elevation 226 of the first bottom intersection 220. In an aspect, because the top 214 and the bottom 216 of the first catalyst conduit define the first top angle $\alpha$ and the first bottom angle $\beta$ to be equal, the first catalyst conduit 912 directs all of the first stream of catalyst to the riser 910 in the first trajectory 222 defining the first trajectory angle $\gamma$.

In an aspect, a general first trajectory of the first catalyst stream shown by a dashed line 230 will follow a central axis through the first catalyst conduit 912 along the first trajectory 222 with a first trajectory angle $\gamma$ having a substantial, downwardly vertical component as it enters the riser 910 through the inlet 915.

The second catalyst conduit 952 is in upstream communication with the riser 910 and defines a second catalyst inlet 997 with the riser. In an aspect, the second catalyst inlet 997 is in the enlarged lower section 911 of the riser. The second catalyst conduit 952 has a second top 254 which intersects the riser at the second inlet 997 at a second top intersection 258 and a second bottom 256 which intersect the riser at the second inlet 997 at a second bottom intersection 260. The second top 254 intersects the riser 910, in an aspect, the enlarged lower section 911 of the riser, defining a second top angle δ, upwardly relative to vertical at the second top intersection 258, and the second bottom 256 intersects the riser 910, in an aspect, the enlarged lower section 911 of the riser, defining a second bottom angle ε, upwardly relative to vertical at the second bottom intersection 260. In an aspect, the second top angle δ and the first top angle α and the first bottom angle β may be equal. In a further aspect, the second bottom angle ε and may be greater than the second top angle δ of the second catalyst conduit 952. Accordingly, the second bottom angle ε may be greater than the first top angle α and the first bottom angle β of the first catalyst conduit 912.

In a further aspect, the second catalyst conduit 952 may be in downstream communication with the outlet port 24 (FIG. 1) of the riser 10 and in which case may be termed a second carbonized catalyst conduit for carrying a second carbonized catalyst stream. In this case, the first stream of catalyst will be hotter than the second stream of catalyst. In the alternative, it is also contemplated that the second catalyst conduit 952 may be in direct and downstream communication with the regenerator vessel 50 and may therefore be termed a second regenerated catalyst conduit for carrying a hot second regenerated catalyst stream.

In an aspect, the second catalyst conduit 952 defines a bend 270 in the second catalyst conduit 952. The bend 270 may be disposed outwardly of the second inlet 997. The bend 270 is flanked by an upper segment 272 and a lower segment 274 of the second catalyst conduit 952. An upper bottom 275 of the upper segment 272 upstream of the bend 270 defines an upper bottom angle ζ upwardly relative to vertical. The second bottom 256 is of the lower segment 274 downstream of the bend. The second bottom 256 defines the second bottom angle ε upwardly relative to vertical to be greater than the upper bottom angle ζ. The bend 270 is provided by a mitered joint between the upper segment 272 and the lower segment 274 of the second catalyst conduit 952. The upper bottom angle ζ may be equal to the second top angle δ. Consequently, the upper segment 272 of the second catalyst conduit 952 directs all of the second catalyst stream at an upper trajectory 276 defining an upper trajectory angle η upwardly relative to vertical. The upper trajectory 276 is shown by an arrow along a central axis in the upper segment 272 of the second catalyst conduit 952.

The second bottom 256 of the lower segment 274 of the second catalyst conduit 952 intersects the riser 910, in an aspect, the enlarged lower section 911 of the riser, at the second bottom intersection 260 defining the second bottom angle ε which is greater than the upper bottom angle ζ defined by the upper segment 272. The bend 270 provides the second bottom 256 which defines the second bottom angle ε at the second bottom intersection 260 with the riser 910. The second bottom 256 of the second catalyst conduit 952 directs a portion of the second stream of catalyst to the riser 910 at a second bottom trajectory 282 at the second bottom angle ε imparted by the interior contour of the second bottom 256 at the second bottom intersection 260. The second bottom trajectory 282 is shown by an arrow from the second bottom intersection 260. The second top 254 of the second catalyst conduit 952 directs another portion of the second stream of catalyst to the riser at a second top trajectory 284 at the second top angle δ imparted by the interior contour of the second top 254 at the second top intersection 258. The second top angle δ may be the same as the upper trajectory angle η of the upper trajectory 276 but different from the second bottom angle ε. The second top trajectory 284 is shown by an arrow from the second top intersection 258. The second bottom 256, defining the second bottom angle ε at the second bottom intersection 260 with the riser 910 which may be greater than the second top angle δ will influence the entire second catalyst stream entering into the riser 910 to have a composite, second trajectory 262 defining the second trajectory angle θ which will be greater than the upper trajectory angle η. The second trajectory 262 is shown by an arrow from a second midpoint 264 between the second top intersection 218 and the second bottom intersection 220.

The second stream of catalyst enters the riser through the second catalyst inlet 997 at a second lowermost elevation 278 of the second bottom intersection 260. In an aspect, the second bottom intersection 260 is at a lower elevation than first bottom intersection 220. Consequently, the second stream of catalyst will enter the riser at a second lowermost elevation 278 that is lower than the first lowermost elevation 226. In a further aspect, the first midpoint 224 at which the first catalyst stream enters the riser is at a higher elevation than the second midpoint 264 at which the second catalyst stream enters the riser 910.

In an aspect, the general second trajectory of the second catalyst stream shown by a dashed line 290 will follow a central axis through the second catalyst conduit 952 along the upper trajectory 276 with the upper trajectory angle η having a substantial downwardly vertical component. At the bend 270, the second bottom 256 will impart a more horizontal component to the general second trajectory 290 which will take on the second trajectory 262 at the second trajectory angle θ from the midpoint 264 of the second catalyst inlet 997. The second general trajectory 290 of the second catalyst stream will meet the first general trajectory 230 of the first catalyst stream at the projected intersection 292.

The second trajectory 262 has a second trajectory angle θ that is greater than the upper trajectory angle η and the first trajectory angle γ, so the second catalyst stream entering the riser 910 will have a significant horizontal component. This horizontal component of the second catalyst stream operates in conjunction with the fluidizing gas from the gas distributor 19 to direct a significant portion of the second catalyst stream up the riser more quickly after entering the riser 910. Moreover, the second catalyst stream will ascend to mix with the descending first catalyst stream entering the riser 910 at a higher elevation and having a substantial, downwardly vertical component. The ascending catalyst stream assisted by the ascending fluidizing gas will sweep up the descending first catalyst stream to provide for thorough mixing. The mixed stream of the first stream of catalyst and the second stream of catalyst pass up the riser to be contacted with hydrocarbon feed as described with respect to FIG. 1.

In an aspect, the second bottom angle ε and the second trajectory angle θ is greater than or equal to about 60 degrees. Preferably, the angle ε is about 90 degrees. In an aspect, angles α, β, γ, δ, ζ, and η are all less than about 60 degrees, suitably between about 25 and about 50 degrees and preferably between about 30 and 45 degrees. In an aspect, the second trajectory angle θ may be less than or equal to the second bottom angle ε and may be greater than the second top angle δ of the second catalyst conduit 952. Moreover, the second trajectory angle θ may be greater than the first trajectory angle γ.

An insert 92 in the riser 910 may be disposed between the first catalyst conduit 912 and the second catalyst conduit 952. In an embodiment the insert 92 may be interposed between the first catalyst inlet 915 and the second catalyst inlet 997. The insert 92 may have openings in an outer wall 94 of the insert to allow entry of catalyst into a chamber defined within the wall 94. In another aspect, the wall 94 may be impermeable to catalyst as described with respect to FIGS. 1-8 herein. Consequently, the first stream of catalyst may pass through and/or around the insert 92 to mix with the second stream of catalyst, and the second stream of catalyst may pass through and/or around the insert 92 to mix with the first stream of catalyst.

The first stream of catalyst and the second stream of catalyst may be fed to riser either tangentially or radially.

A refractory lining will coat the riser 10 and the conduits 912 and 952, so the intersections and angles that govern the trajectory of the catalyst streams into the riser will be based on the contour interior surface of the riser 910 and conduits 912 and 952 and the lining thereon.

Figure 10:
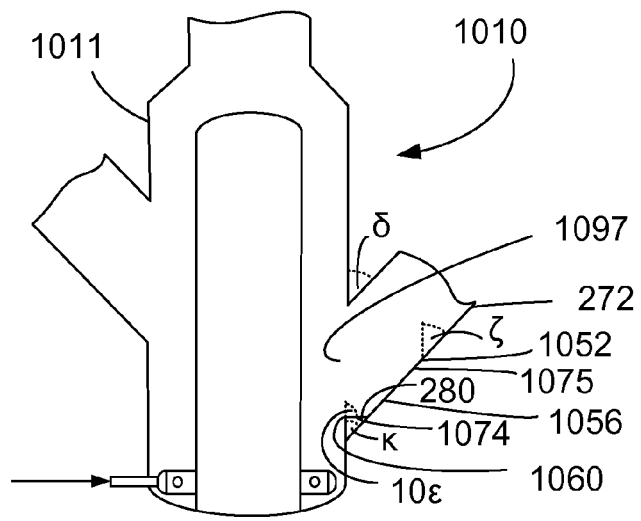
FIG. 10 is a partial schematic, elevational view of an alternative embodiment of the FCC unit of FIG. 9 incorporating an further, alternative embodiment of the present invention.

FIG. 10 illustrates a further embodiment of FIG. 9 with a second catalyst conduit 1052 modified. Elements in FIG. 10 with the same configuration as in FIG. 9 will have the same reference numeral as in FIG. 9. Elements in FIG. 10 which have a different configuration as the corresponding element in FIG. 9 will have the same reference numeral but be preceded with the digit "10" instead of "2". Everything in FIG. 10 is the same as in FIG. 9 with the noted exceptions.

In the embodiment of FIG. 10, a ramp 280 is installed to provide a second bottom 1056 of the second catalyst conduit 1052 at the second inlet 1097. An upper bottom 1075 of the upper segment 272 upstream of the ramp 280 defines an upper bottom angle ζ upwardly relative to vertical. An exterior of the second bottom 1056 of the second catalyst conduit 1052 may intersect the riser 1010, or in an aspect, the enlarged lower section 1011 of the riser 1010, at an exterior angle κ, which may be the same as the second top angle δ. The ramp 280 defines a lower segment 1074 and provides the second bottom 1056 which defines a second bottom angle 10ε at the second bottom intersection 1060 with the riser 1010. The second bottom angle 10ε is greater than the upper bottom angle ζ.

The ramp may be disposed outwardly of the second inlet 1097. Accordingly, the second bottom 1074 defining second bottom angle 10ε in FIG. 10 can effectively operate the same way as the second bottom 274 defining the second bottom angle ε in FIG. 9.

Example

We conducted Computational Fluid Dynamics modeling to determine performance of different embodiments of the present invention. The first regenerated catalyst stream was devoid of coke, had a catalyst flow rate of 8,647,893 kg/h (19,065,343 lb/hr), a gas flow rate of 11,674 kg/hr (25,738 lb/hr) and a temperature of 742° C. (1,367° F.). The second carbonized catalyst stream was fully coked indicating a coke concentration of 0.858 wt-% of catalyst, also had a catalyst flow rate of 8,647,893 kg/h (19,065,343 lb/hr), a gas flow rate of 10,810 kg/hr (23,833 lb/hr) and a temperature of 549° C. (1,020° F.). The catalyst and gas properties in Table I were also utilized in the model.

TABLE I

| Property | Metric | | English | |
| --- | --- | --- | --- | --- |
| Catalyst Density | 1442 | kg/m³ | 90 | lb/ft³ |
| Gas Density | 1.041 | kg/m³ | 0.065 | lb/ft³ |
| Gas Viscosity | 0.014 | cP | | |
| Gas Conductivity | 0.024 | W/m-K | 0.014 | Btu/h-ft-° F. |
| Catalyst Conductivity | 0.100 | W/m-K | 0.58 | Btu/h-ft-° F. |
| Gas Heat Capacity | 1004.83 | J/kg-K | 0.24 | Btu/lb-° F. |
| Catalyst Heat Capacity | 1151.370 | J/kg-K | 0.275 | Btu/lb-° F. |

The fluidizing steam rate was 69,638 kg/hr (153,525 lb/hr) from the single distributor 19. The steam temperature was 154° C. (310° F.). All of the modeling configurations had the horizontal angle between the regenerated catalyst conduit 12 and the carbonized catalyst conduit 52 of 180°. Moreover, all of the modeling configurations had the inlet 15 of the regenerated catalyst conduit 12 above the inlet 97 for the carbonized catalyst conduit 52. The modeling configuration that corresponded to FIG. 6 had a shorter transition section 13 as reflected in the various ratios. Different catalyst inlet configurations were also tested. "Straight" signifies that the catalyst conduit does not bend at the catalyst inlet. "Bent" signifies that the catalyst conduit bends at the catalyst inlet. In the modeling configurations that had different catalyst inlet configurations, the bent configuration was always on the lowermost catalyst inlet.

Based on these parameters, modeling indicated the embodiments of the invention would yield the temperature differentials as reported in Table II.

TABLE II

| Figure No. | Catalyst Inlet Configuration | | Lower Section Height to Diameter Ratio | Transition Section Height to Lower Section Diameter Ratio | Transition Section Height to Upper Section Diameter | ΔT, ° C. (° F.) |
| --- | --- | --- | --- | --- | --- | --- |
| | Regenerated | Carbonized | | | | |
| 2 | straight | bent | 1.9 | 1.7 | 2.7 | 8 (15) |
| 2 | bent | bent | 1.9 | 1.7 | 2.7 | 12 (21) |
| 3 | bent | bent | 1.9 | 1.7 | 2.7 | 12 (21) |
| 6 | straight | bent | 1.5 | 0.4 | 0.6 | 18 (32) |

Temperature differential was calculated at a location in the riser 10, 1 meter (3.3 feet) below the feed distributors 18, which, in the modeled riser 10, was in the upper riser 17 above the transition section 13. The temperature differential represents the maximum temperature spread for the catalyst, typically the difference of the hottest regenerated catalyst and the coolest carbonized catalyst. The configurations of FIGS. 2 and 3 showed the best performance for the same insert cross-sectional shape in terms of catalyst mixing which produced essentially homogeneous catalyst temperature. However, the arrangement of catalyst inlet configuration may also improve the homogeneity of the mixing. For the embodiment of FIG. 2, the configuration of a bent second catalyst conduit to provide a horizontal trajectory of the second stream of catalyst at the second catalyst inlet and a straight first catalyst conduit to provide a downwardly vertical trajectory of the first stream of catalyst at the first catalyst inlet performed superiorly to the configuration where both catalyst conduits are bent at the inlets.

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for mixing two streams of catalyst comprising:
   a riser;
   a first catalyst conduit in communication with the riser;
   a second catalyst conduit in communication with the riser, the second catalyst conduit being in downstream communication with the riser; and
   an insert in said riser between said first catalyst conduit and said second catalyst conduit, said insert obstructing direct passage between said first catalyst conduit and said second catalyst conduit and a wall of said insert being spaced apart from a wall of said riser.

2. The apparatus of claim 1 wherein said insert has a closed top.

3. The apparatus of claim 1 wherein said first catalyst conduit is connected to said riser at a first catalyst inlet and said second catalyst conduit is connected to said riser at a second catalyst inlet and the insert is interposed between said first catalyst inlet and said second catalyst inlet.

4. The apparatus of claim 1 wherein said insert is in an enlarged section of the riser.

5. The apparatus of claim 4 further including narrowed section of said riser above said insert.

6. The apparatus of claim 5 further including a transition section of the riser between the enlarged section and the narrowed section and the insert does not extend into the transition section.

7. The apparatus of claim 5 further including a feed distributor in said narrowed section of the riser.

8. The apparatus of claim 1 wherein said insert has a horizontal cross-sectional shape selected from the group consisting of a circle, a rhomboid, an oval and two offset contiguous parabolas.

9. The apparatus of claim 1 wherein said insert has an outer wall having at least one dimple.

10. The apparatus of claim 9 wherein said outer wall has a plurality of dimples.

11. The apparatus of claim 1 further comprising a vane on said insert that facilitates swirling of said catalyst.

12. The apparatus of claim 1 wherein said first catalyst conduit is connected to said riser at a first catalyst inlet and said second catalyst conduit is connected to said riser at a second catalyst inlet and said vane being sloped with a lower end of said vane facing said first catalyst inlet and an upper end of said vane facing said second catalyst inlet.

13. The apparatus of claim 1 wherein an outer wall of said insert is impermeable to catalyst.

14. An apparatus for mixing two streams of catalyst comprising:
   a riser;
   a first catalyst conduit in communication with the riser at a first catalyst inlet;
   a second catalyst conduit in communication with the riser at a second catalyst inlet, the second catalyst conduit being in downstream communication with the riser and
   an insert in said riser between said first catalyst inlet and said second catalyst inlet and a wall of said insert being spaced apart from a wall of said riser.

15. The apparatus of claim 14 wherein said insert has a horizontal cross-sectional shape selected from the group consisting of a diamond, a circle, a rectangle, an oval and two offset contiguous parabolas.

16. The apparatus of claim 14 wherein said insert has an outer wall having a plurality of dimples.

17. The apparatus of claim 14 further comprising a vane on said insert that facilitates swirling of said catalyst, said vane being sloped with a lower end of said vane facing said first catalyst inlet and an upper end of said vane facing said second catalyst inlet.

18. An apparatus for mixing two streams of catalyst comprising:
   a riser having an enlarged lower section and a narrowed upper section and a transition section in between the enlarged lower section and the narrowed upper section;
   a feed distributor in the narrowed upper section of the riser;
   a first catalyst conduit in communication with the enlarged lower section of the riser;
   a second catalyst conduit in communication with the enlarged lower section of the riser; and
   an insert in the enlarged lower section of the riser between said first catalyst conduit and said second catalyst conduit below the transition section, wherein said first catalyst conduit is connected to said riser at a first catalyst inlet and said second catalyst conduit is connected to said riser at a second catalyst inlet and further comprising a vane on said insert that facilitates swirling of said catalyst, said vane being sloped with a lower end of said vane facing said first catalyst inlet and said upper end of said vane facing said second catalyst inlet.

19. The apparatus of claim 18 wherein said insert has an outer wall having a plurality of dimples.

20. The apparatus of claim 18, wherein said insert has a closed top.

* * * * *